(12) United States Patent
Williams

(10) Patent No.: US 9,756,847 B1
(45) Date of Patent: Sep. 12, 2017

(54) DECOY ACTUATING APPARATUS

(71) Applicant: Ted M. Williams, Winona, TX (US)

(72) Inventor: Ted M. Williams, Winona, TX (US)

( * ) Notice: Subject to any disclaimer, the term of this patent is extended or adjusted under 35 U.S.C. 154(b) by 236 days.

(21) Appl. No.: 14/855,788

(22) Filed: Sep. 16, 2015

(51) Int. Cl.
*A01M 31/06* (2006.01)
*A01M 99/00* (2006.01)
*F16H 19/06* (2006.01)
*F16H 57/02* (2012.01)

(52) U.S. Cl.
CPC ............ *A01M 31/06* (2013.01); *A01M 99/00* (2013.01); *F16H 19/06* (2013.01); *F16H 57/02* (2013.01)

(58) Field of Classification Search
CPC .............................. A01M 31/06; A01M 99/00
USPC .......................................................... 43/2, 3
See application file for complete search history.

(56) References Cited

U.S. PATENT DOCUMENTS

| | | | |
|---|---|---|---|
| 217,483 A | 7/1879 | Redmond | |
| 1,468,780 A * | 9/1923 | Fraser | A01M 31/06 43/3 |
| 2,413,418 A * | 12/1946 | Rulison | A01M 31/06 43/3 |
| 2,457,295 A | 12/1948 | Woodhead | |
| 2,460,128 A * | 1/1949 | Greenleaf | A01M 31/06 43/3 |
| 2,678,778 A * | 5/1954 | Gibson | A01M 31/06 242/125.2 |
| 2,709,866 A * | 6/1955 | Stumvoll | A01M 31/06 43/3 |
| 3,050,895 A * | 8/1962 | Bratland | A01M 31/06 43/3 |
| 4,757,630 A * | 7/1988 | Torberg | A01M 31/06 43/3 |
| 4,827,653 A * | 5/1989 | Sewell | A01M 31/06 43/2 |
| 5,367,813 A * | 11/1994 | Cherry | A01M 31/06 43/2 |
| 6,845,586 B1 | 1/2005 | Brock, IV | |
| 7,322,144 B2 | 1/2008 | Brewer | |

(Continued)

*Primary Examiner* — Peter M Poon
*Assistant Examiner* — Magdalena Topolski
(74) *Attorney, Agent, or Firm* — R. Keith Harrison

(57) ABSTRACT

A decoy actuating apparatus includes a decoy line actuating mechanism having a mechanism housing and a mechanism housing interior in the mechanism housing. A catch pin track is in the mechanism housing and communicates with the mechanism housing interior. The catch pin track has a line engaging track portion and a line disengaging track portion. A catch pin plate is disposed for rotation in the mechanism housing interior of the mechanism housing. A plate drive motor drivingly engages the catch pin plate for rotation. A catch pin slot is in the catch pin plate. An actuating line space is between the catch pin plate and the mechanism housing. A catch pin is disposed for sliding displacement in the catch pin slot of the catch pin plate and interfaces with the catch pin track. The catch pin is deployed in a line catching position and protrudes into the actuating line space when engaging the line engaging track portion. The catch pin is deployed in a line releasing position and clears the actuating line space when engaging the line disengaging track portion of the catch pin track. A decoy actuating line extends through the actuating line space. The decoy actuating line can be attached to a decoy to pull and release the waterfowl decoy and impart a lifelike feeding or diving motion to the decoy.

20 Claims, 7 Drawing Sheets

(56) References Cited

U.S. PATENT DOCUMENTS

| | | |
|---|---|---|
| 8,950,103 B2 | 2/2015 | Bullerdick et al. |
| 2004/0163300 A1* | 8/2004 | Pinkston ............... A01M 31/06 43/3 |
| 2008/0263930 A1* | 10/2008 | Sieman ................ A01M 31/06 43/3 |
| 2011/0146132 A1 | 6/2011 | Young |

* cited by examiner

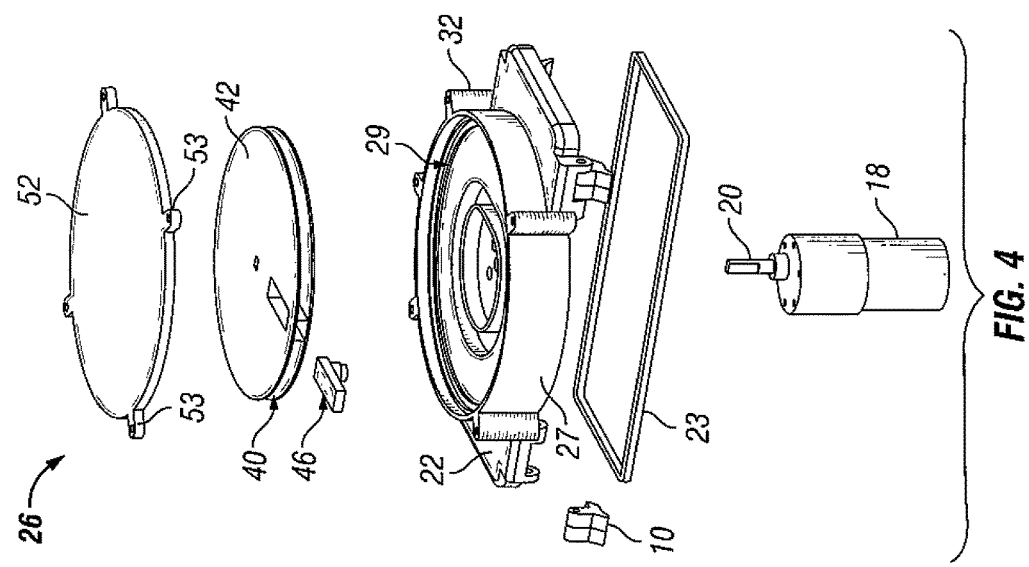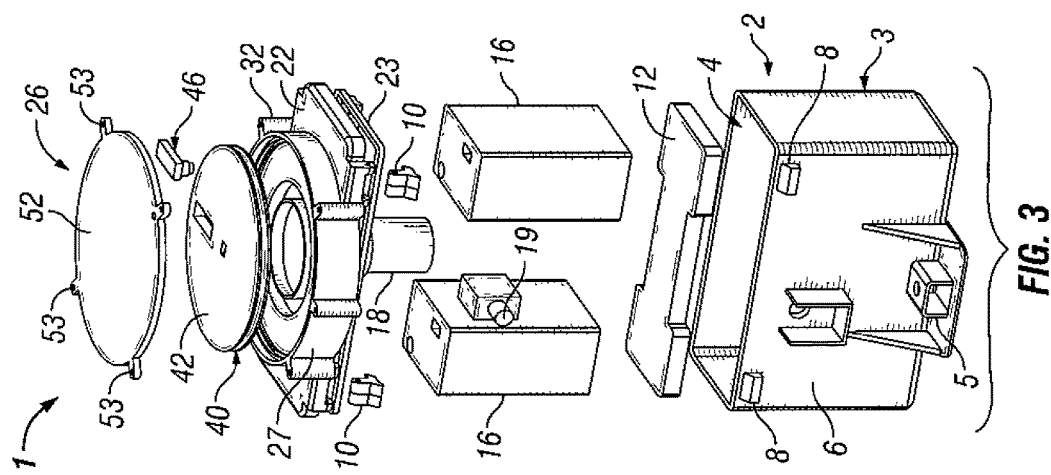

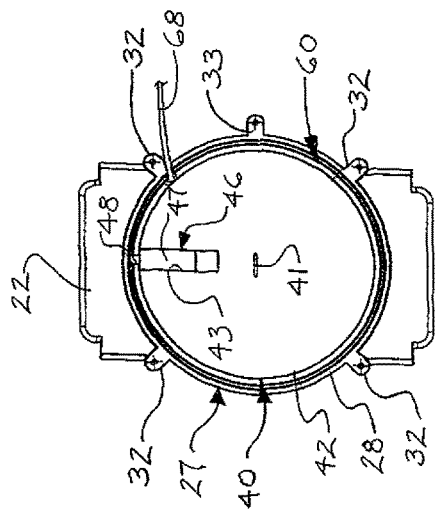
FIG. 6
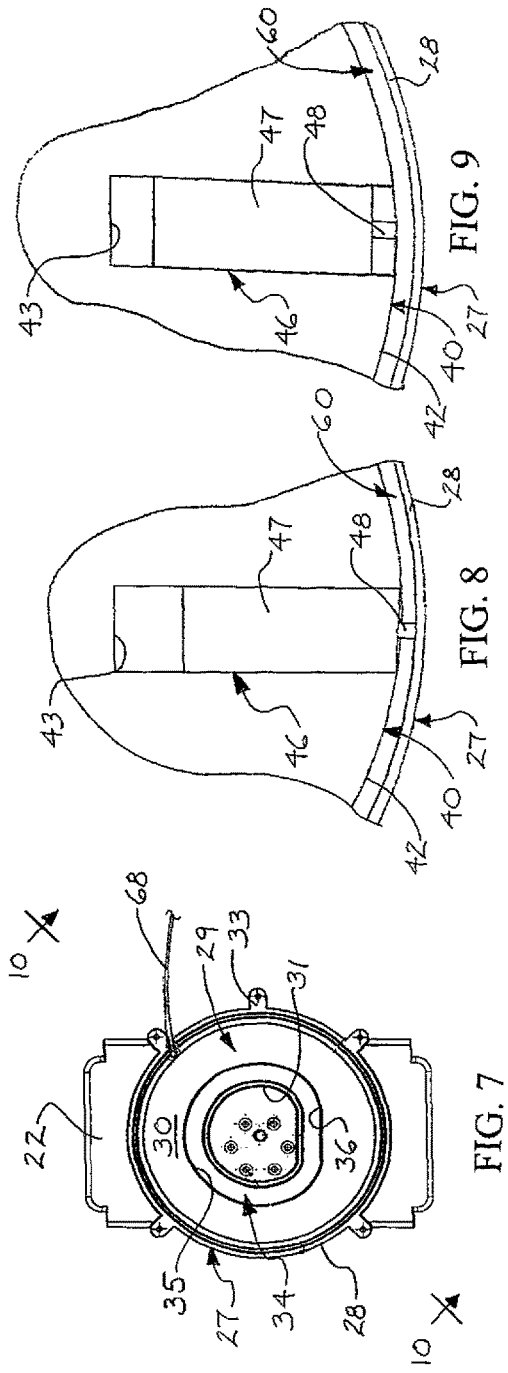
FIG. 9
FIG. 8
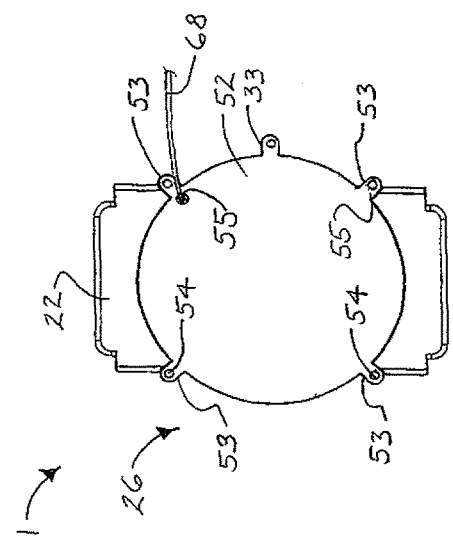
FIG. 5
FIG. 7

DECOY ACTUATING APPARATUS

FIELD

Illustrative embodiments of the disclosure generally relate to apparatuses for imparting lifelike movements to decoys. More particularly, illustrative embodiments of the disclosure relate to a decoy actuating apparatus which imparts a lifelike feeding or diving motion to a waterfowl decoy.

SUMMARY

Illustrative embodiments of the disclosure are generally directed to a decoy actuating apparatus which imparts a lifelike feeding or diving motion to a waterfowl decoy. An illustrative embodiment of the decoy actuating apparatus includes a decoy line actuating mechanism having a mechanism housing and a mechanism housing interior in the mechanism housing. A catch pin track is in the mechanism housing and communicates with the mechanism housing interior. The catch pin track has a line engaging track portion and a line disengaging track portion. A catch pin plate is disposed for rotation in the mechanism housing interior of the mechanism housing. A plate drive motor drivingly engages the catch pin plate for rotation. A catch pin slot is in the catch pin plate. An actuating line space is between the catch pin plate and the mechanism housing. A catch pin is disposed for sliding displacement in the catch pin slot of the catch pin plate and interfaces with the catch pin track. The catch pin is deployed in a line catching position and protrudes into the actuating line space when engaging the line engaging track portion. The catch pin is deployed in a line releasing position and clears the actuating line space when engaging the line disengaging track portion of the catch pin track. A decoy actuating line extends through the actuating line space. The decoy actuating line can be attached to a decoy to pull and release the waterfowl decoy and impart a lifelike feeding or diving motion to the decoy.

BRIEF DESCRIPTION OF THE DRAWINGS

Illustrative embodiments of the disclosure will now be described, by way of example, with reference to the accompanying drawings, wherein:

FIG. 3 is an exploded perspective view of an illustrative embodiment of the decoy actuating apparatus;

FIG. 4 is an exploded perspective view of a typical decoy line actuating mechanism of the decoy actuating apparatus;

FIG. 5 is a top view of the illustrative decoy actuating apparatus;

FIG. 6 is a top view of the illustrative decoy actuating apparatus, with a housing cover removed from the apparatus;

FIG. 7 is a top view of the illustrative decoy actuating apparatus, with both the housing cover and a catch pin plate removed from the apparatus to expose a catch pin track in the mechanism housing of the decoy line actuating mechanism;

FIG. 8 is an enlarged sectional view of the catch pin plate deployed in place in the mechanism housing of the decoy line actuating mechanism, with a sliding catch pin deployed in a catch pin slot in the catch pin plate and the catch pin disposed in a line catching position;

FIG. 9 is a enlarged sectional view of the catch pin plate with the catch pin deployed in a line releasing position;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is non-limiting and is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "upper", "lower", "above", 'below", "top", "horizontal" and "vertical" as used herein are intended for descriptive purposes only and are not necessarily intended to be construed in a limiting sense.

Figure 1:
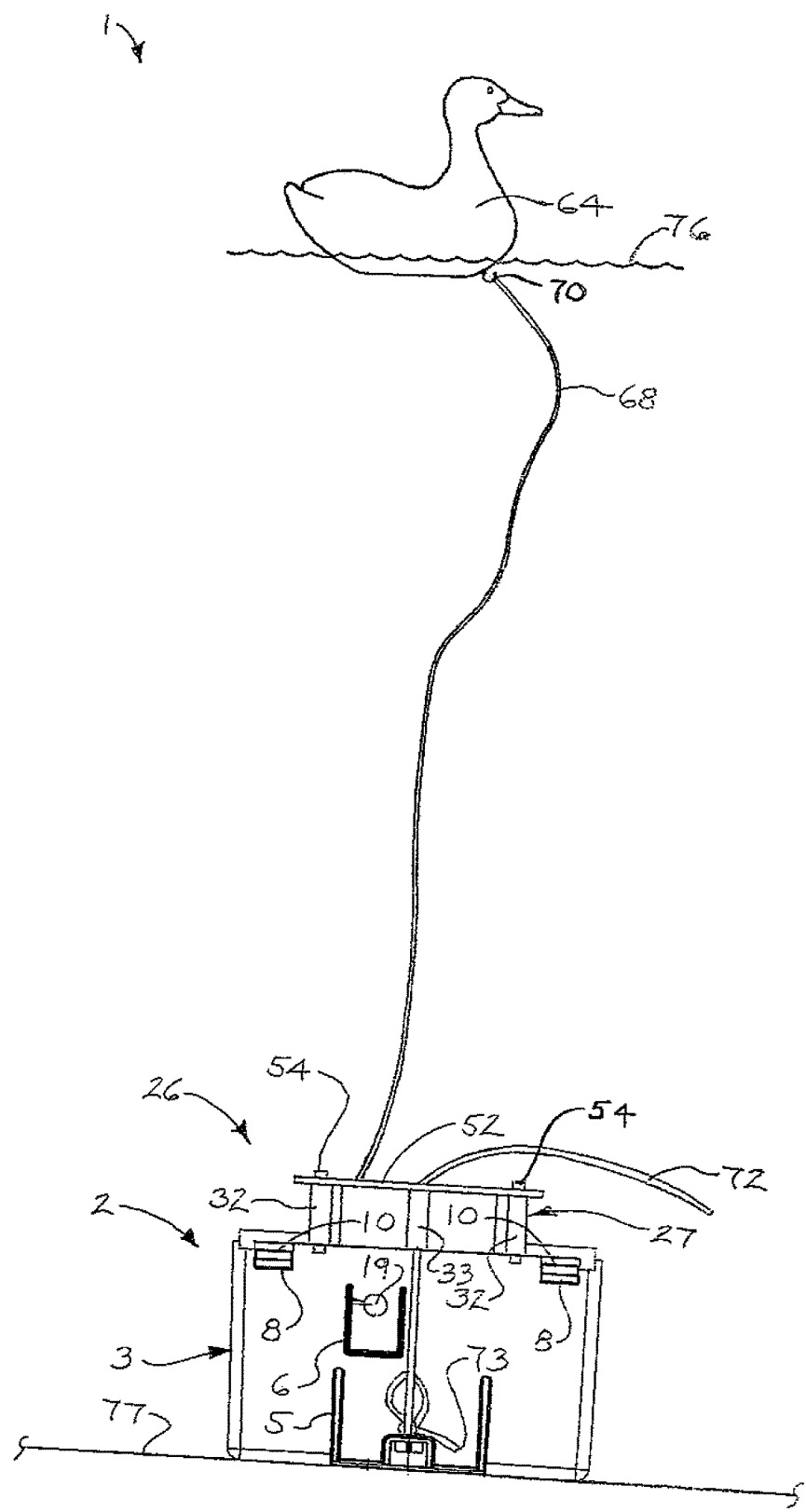
FIG. 1 is a side view of an illustrative embodiment of the decoy actuating apparatus, deployed in a water body, with a floating waterfowl decoy attached to the apparatus and disposed in a non-actuated, upright position.
Figure 2:
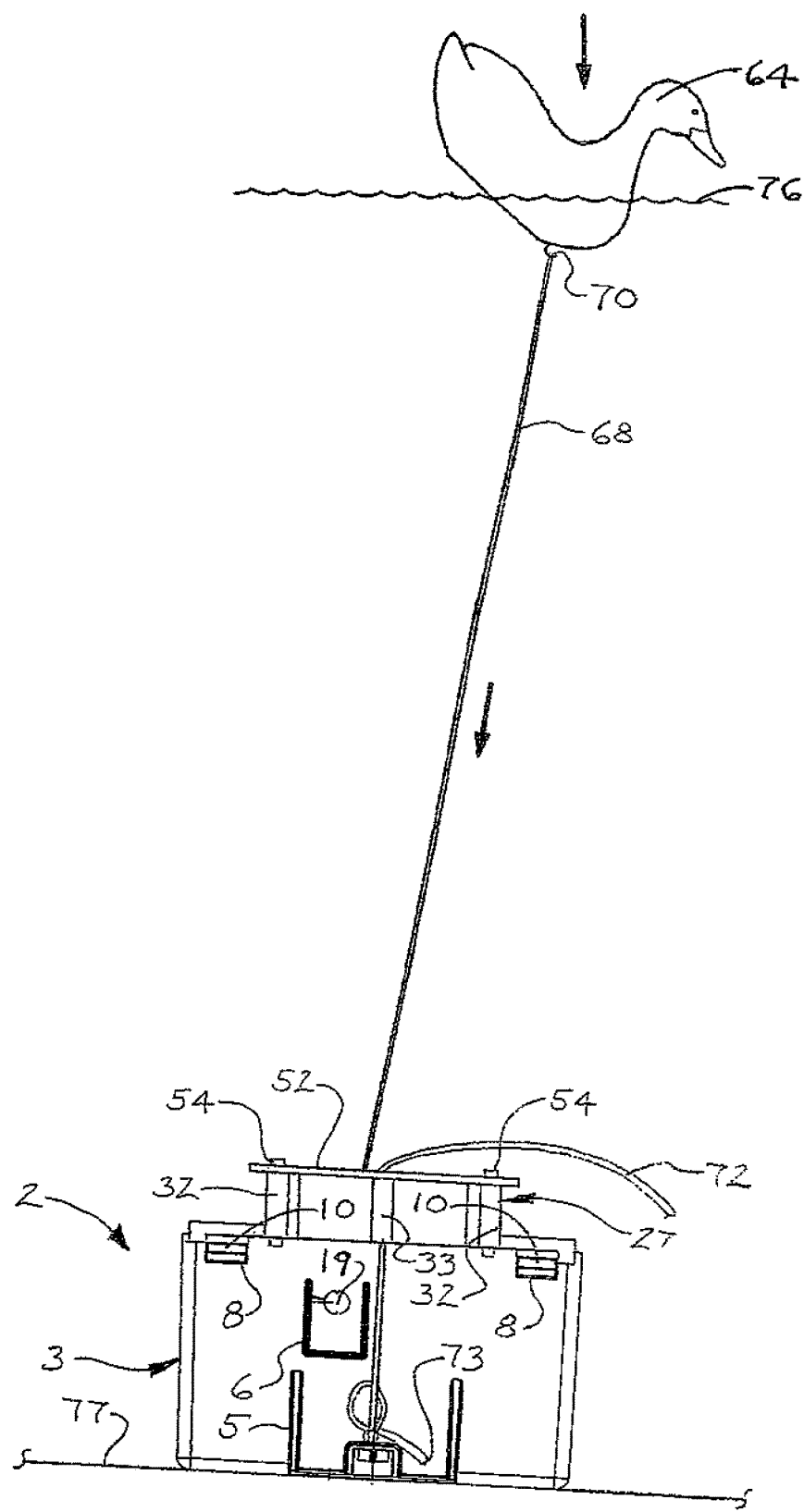
FIG. 2 is a side view of the decoy actuating apparatus illustrated in FIG. 1, with the apparatus imparting a feeding or diving motion to the waterfowl decoy in typical application of the apparatus.

Referring initially to FIGS. 1 and 2 of the drawings, an illustrative embodiment of the decoy actuating apparatus is generally indicated by reference numeral 1. In some embodiments, the decoy actuating apparatus 1 may include an apparatus base 2. A decoy line actuating mechanism 26 may be provided on the apparatus base 2. The decoy line actuating mechanism 26 engages a decoy actuating line 68 to repeatedly pull and release the decoy actuating line 68. A waterfowl decoy 64 is attached to the decoy actuating line 68. Accordingly, in typical application of the decoy actuating apparatus 1, which will be hereinafter described, the apparatus base 2 may be placed on a water body bottom 77 of a water body 76. The waterfowl decoy 64 floats on the surface of the water body 76. The decoy line actuating mechanism 26 repeatedly pulls and releases the decoy actuating line 68 such that the waterfowl decoy 64 simulates a feeding or diving motion (FIG. 2) from the upright position illustrated in FIG. 1. In some embodiments, a spring-loaded decoy line length adjusting device (not illustrated), which may be conventional, may be provided on the decoy line 68 to facilitate selective length adjustment of the decoy line 68 according to the depth of the water body 76.

Referring next to FIGS. 1-12 of the drawings, in some embodiments, the apparatus base 2 may include an apparatus base housing 3 having a housing interior 4, as illustrated in FIG. 3. In some embodiments, at least one anchor line attachment flange 5 may extend from an exterior surface of the apparatus base housing 3, as illustrated in FIGS. 1 and 2. The anchor line 72 may have a first anchor line end 73 which may be tied or otherwise attached to the anchor line attachment flange 5 and a second anchor line end (not illustrated) which may be tied or otherwise attached to a post or other support (not illustrated) to anchor the apparatus base 2 on the water body bottom 77 of the water body 76. As further illustrated in FIGS. 1 and 2, in some embodiments, an anchor line boss 33 may protrude from an exterior surface of the apparatus base housing 3. The anchor line 72 may extend from the anchor line attachment flange 5 and through the anchor line boss 33, respectively, to the post or other support to which the anchor line 72 is attached.

As further illustrated in FIG. 3, a housing cover 22 may be detachably attached to the apparatus base housing 3 according to the knowledge of those skilled in the art. Accordingly, in some embodiments, the housing cover 22 may be detachably attached to the apparatus base housing 3 via multiple lid latch receptacles 8 on the apparatus base housing 3 and companion lid latches 10 on the housing cover 22. In other embodiments, the housing cover 22 may be hinged or pivoted to the apparatus base housing 3. As illustrated in FIGS. 3 and 4, in some embodiments, a housing cover gasket 23 may be disposed between the housing cover 22 and the apparatus base housing 3 to impart a liquid-tight seal between the housing interior 4 and the exterior of the apparatus base housing 3.

As illustrated in FIG. 3, the housing interior 4 of the apparatus base housing 3 may be appropriately sized and configured to accommodate at least one battery 16 and a plate drive motor 18 for purposes which will be hereinafter described. In some embodiments, a base weight 12 may be provided in the housing interior 4 of the apparatus base housing 3 to weight the apparatus base 2 on the water body bottom 77 of the water body 76 (FIGS. 1 and 2). The plate drive motor 18 may include a motor switch 19 which facilitates selective operation of the plate drive motor 18. In some embodiments, the motor switch 19 may be accessible on the exterior of the apparatus base housing 3. A switch guard 6 may protrude from the exterior surface of the apparatus base housing 3 and at least partially surround or enclose the motor switch 19 for switch protection purposes.

As further illustrated in FIGS. 3 and 4, the decoy line actuating mechanism 26 may include a mechanism housing 27. In some embodiments, the mechanism housing 27 may extend from the housing cover 22 of the apparatus base housing 3. The mechanism housing 27 may be fabricated in one piece with the housing cover 22 using casting or molding techniques known by those skilled in the art. Alternatively, the housing cover 22 and the mechanism housing 27 may be fabricated separately, and the mechanism housing 27 may be attached to the housing cover 22 using mechanical fasteners and/or other techniques known by those skilled in the art.

Figure 10:
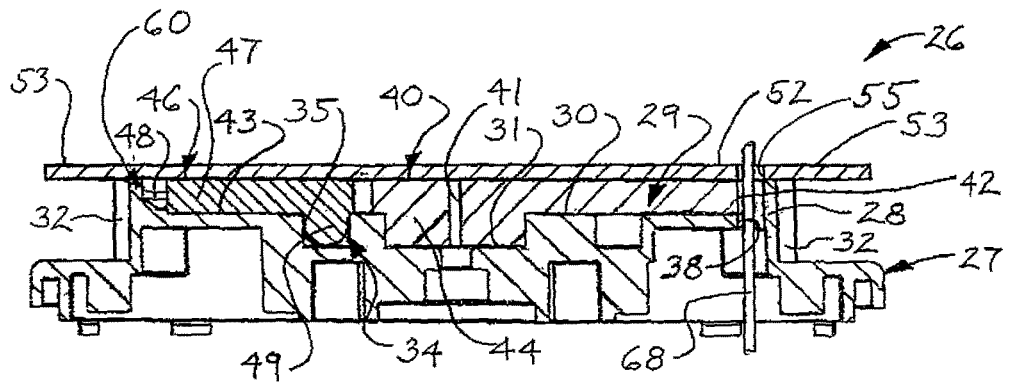
FIG. 10 is a cross-sectional view, taken along section lines 10-10 in FIG. 7, of the typical decoy line actuating mechanism.

As illustrated in FIG. 10, the mechanism housing 27 of the decoy line actuating mechanism 26 may include a mechanism housing bottom 30. A mechanism housing wall 28 may extend upwardly from the mechanism housing bottom 30. In some embodiments, the mechanism housing wall 28 may be generally cylindrical in shape. A mechanism housing interior 29 is formed by the mechanism housing bottom 30 and the mechanism housing wall 28. As further illustrated in FIG. 10, a central hub cavity 31 may extend into the mechanism housing bottom 30 for purposes which will be hereinafter described. In some embodiments, multiple cover fastener bosses 32 may protrude from an exterior surface of the mechanism housing wall 28 in spaced-apart relationship to each other around the mechanism housing 27 for purposes which will be hereinafter described.

As illustrated in FIG. 7, a catch pin track 34 extends into the mechanism housing bottom 30 of the mechanism housing 27. The catch pin track 34 may be endless or continuous and encircles or surrounds the central hub cavity 31. As further illustrated in FIG. 7, the catch pin track 34 may include a line engaging track portion 35 and a line disengaging track portion 36 which extends from the line engaging track portion 35. The line engaging track portion 35 may be generally curved or semicircular, whereas the line disengaging track portion 36 may be generally straight and continuous with the line engaging track portion 35. Accordingly, the radial distance between the line disengaging track portion 36 and the mechanism wall 28 of the mechanism housing 27 may be greater than the radial distance between the line engaging track portion 35 and the mechanism wall 28. The purpose of the catch pin track 34 will be hereinafter described.

As illustrated in FIGS. 6 and 10, a catch pin plate 40 is disposed for rotation in the mechanism housing interior 29 of the mechanism housing 27. The catch pin plate 40 may be circular with an outer plate edge 42 (FIG. 6). The catch pin plate 40 may include a central plate hub 44 (FIG. 10) which inserts into the central hub cavity 31 in the mechanism housing bottom 30 of the mechanism housing 27. A central motor shaft opening 41 may extend through the catch pin plate 40. Accordingly, the plate drive motor 18 (FIG. 4) may have a motor shaft 20 which inserts into the motor shaft opening 41 to drivingly engage the catch pin plate 40 for rotation in the mechanism housing interior 29 of the mechanism housing 27. As further illustrated in FIGS. 6 and 10, a catch pin slot 43 is provided in the catch pin plate 40. The catch pin slot 43 may extend in radial relationship to the catch pin plate 40 between the motor shaft opening 41 and the outer plate edge 42, and may open to the outer plate edge 42.

Figure 11:
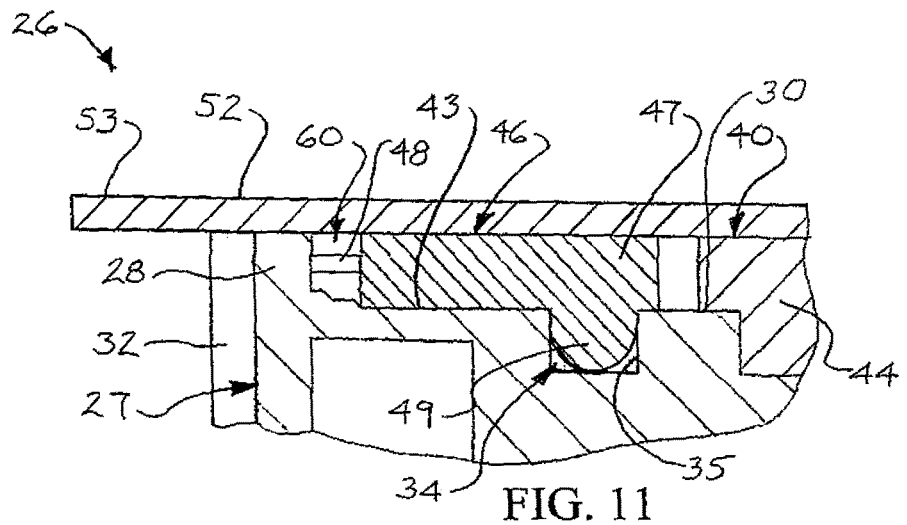
FIG. 11 is an enlarged sectional view of a portion of the decoy line actuating mechanism illustrated in FIG. 10, with the catch pin deployed in the line catching position in the catch pin slot of the catch pin plate.
Figure 12:
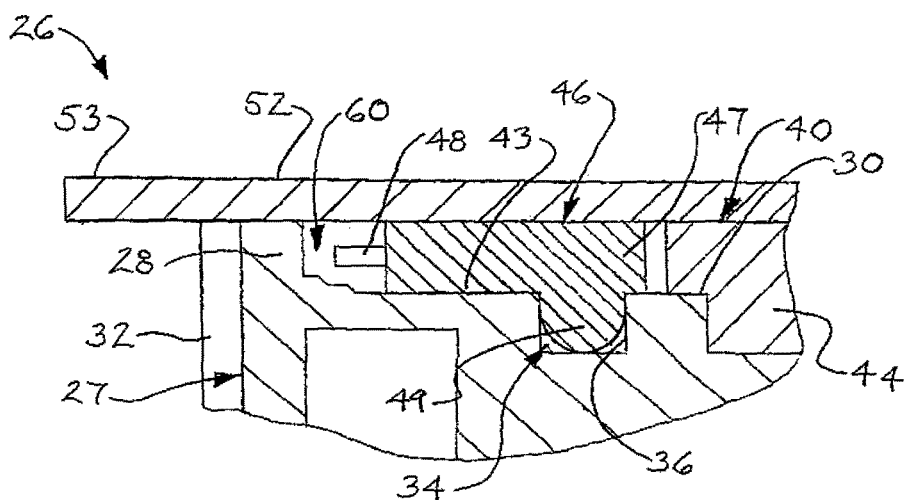
FIG. 12 is an enlarged sectional view of another portion of the decoy line actuating mechanism illustrated in FIG. 10, with the catch pin deployed in the line releasing position in the catch pin slot.

As illustrated in FIGS. 6-12, a catch pin 46 is disposed for sliding displacement in the radial direction in the catch pin slot 43 of the catch pin plate 40. As particularly illustrated in FIGS. 10-12, the catch pin 46 may include a generally elongated catch pin body 47. A line engaging pin portion 48 may protrude from one end of the catch pin body 47. A line engaging flange 49 may protrude from the catch pin body 47. Accordingly, the line engaging flange 49 of the catch pin 46 inserts into the catch pin track 34 in the mechanism housing bottom 30 of the mechanism housing 27 as the catch pin body 47 of the catch pin 46 remains disposed within the catch pin slot 43 of the catch pin plate 40. An annular actuating line space 60 is formed between the outer plate edge 42 of the catch pin plate 40 and the interior surface of the mechanism housing wall 28 of the mechanism housing 27. Accordingly, as the plate drive motor 18 rotates the catch pin plate 40 in the mechanism housing interior 29 of the mechanism housing 27, the catch pin 46 rotates with the catch pin plate 40. The catch pin flange 49 of the catch pin 46 traverses the catch pin track 34 in the mechanism housing bottom 30 of the mechanism housing 27. As the catch pin flange 49 traverses the line engaging track portion 35 of the catch pin track 34, as illustrated in FIG. 11, the catch pin 46 is deployed outwardly, or toward the outer plate edge 42 of the catch pin plate 40, in the catch pin slot 43, and the line engaging pin portion 48 of the catch pin 46 spans the actuating line space 60 between the catch pin plate 40 and the mechanism housing wall 28 of the mechanism housing 27. Conversely, as illustrated in FIG. 12, as the catch pin flange 49 of the catch pin 46 traverses the line disengaging track portion 36 of the catch pin track 34, the catch pin 46 is disposed inwardly, or away from the outer plate edge 42 of the catch pin plate 40, in the catch pin slot 43 such that the line engaging pin portion 48 of the catch pin 46 clears the actuating line space 60.

As further illustrated in FIGS. 3-5, a housing cover 52 may be provided on the mechanism housing 27 of the decoy line actuating mechanism 26 to close the mechanism housing interior 29. The housing cover 52 may be attached to the mechanism housing 27 according to the knowledge of those skilled in the art. Accordingly, in some embodiments, multiple cover mount flanges 53 may protrude from the edge of the housing cover 52. Cover mount fasteners 54 (FIG. 5) may be extended through fastener openings (not illustrated) in the respective cover mount flanges 53 and threaded into the respective underlying cover fastener bosses 32 on the exterior of the mechanism housing wall 28. As further illustrated in FIGS. 5 and 10, a cover actuating line opening 55 may be provided in the housing cover 52. As illustrated in FIG. 10, the cover actuating line opening 55 may register with the underlying housing actuating line opening 38 in the mechanism housing bottom 30 of the mechanism housing 27.

Figure 2A:
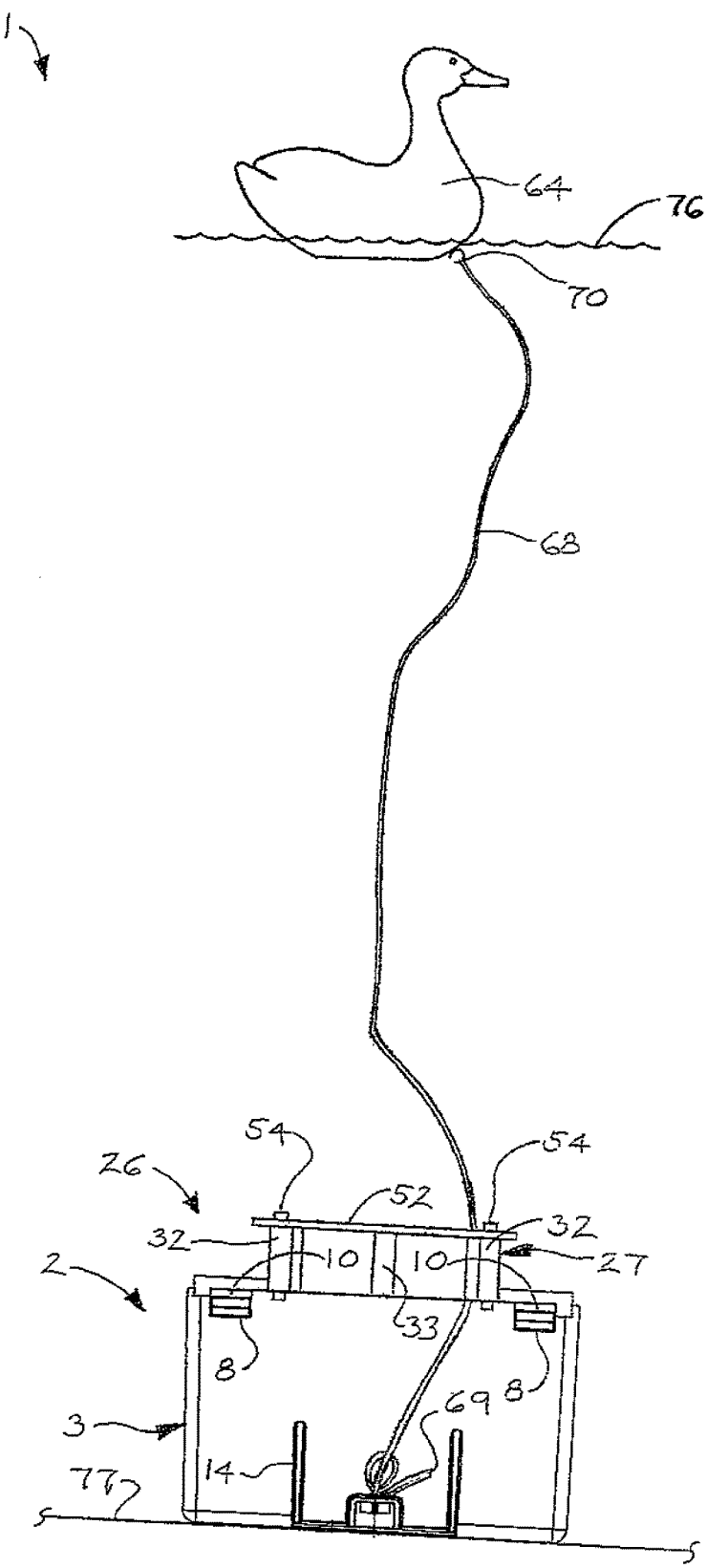
FIG. 2A is a side view of the decoy actuating apparatus opposite to that illustrated in FIGS. 1 and 2, more particularly illustrating typical routing of a decoy actuating line through a decoy line actuating mechanism of the apparatus to the waterfowl decoy.

As illustrated in FIG. 2A, an actuating line attachment flange 14 may be provided on the exterior surface of the apparatus base housing 3. A first actuating line end 69 of the decoy actuating line 68 may be tied or otherwise attached to the actuating line attachment flange 14. As illustrated in FIG. 10, the decoy actuating line 68 may extend from the actuating line attachment flange 14 through the housing actuating line opening 38 in the mechanism housing bottom 30 of the mechanism housing 27, and then through the actuating line space 60 between the catch pin plate 40 and the mechanism housing wall 28 and the cover actuating line opening 55 in the housing cover 52, respectively. A second actuating line end 70 of the decoy actuating line 68 may be tied or otherwise attached to a decoy hook 65 on the waterfowl decoy 64.

Figure 13:
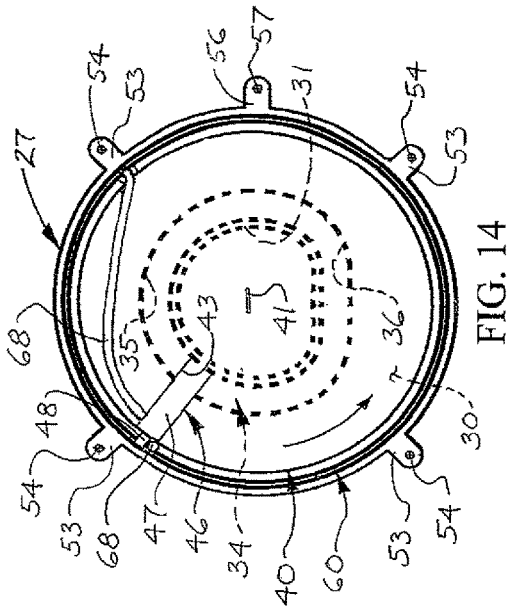
FIG. 13 is a top view of the decoy line actuating mechanism, illustrating the catch pin in the line catching position prior to catching or snagging the decoy actuating line.

Referring next to FIGS. 8-16 of the drawings, responsive to operation of the plate drive motor 18 (FIGS. 2 and 3), the catch pin plate 40 rotates in the mechanism housing interior 29 (FIG. 10) of the mechanism housing 27. The sliding catch pin 46, confined in the catch pin slot 43, rotates with the catch pin plate 40. As the catch pin flange 49 (FIG. 11) on the catch pin 46 traverses the line engaging track portion 35 of the catch pin track 34, the line engaging pin portion 48 of the catch pin 46 spans the actuating line space 60 between the mechanism housing wall 28 and the catch pin plate 40, as illustrated in FIGS. 8 and 11. Accordingly, as illustrated in FIG. 13, the line engaging pin portion 48 of the catch pin 46 catches or snags the segment of the decoy actuating line 68 which traverses the actuating line space 60 in the mechanism housing interior 29.

Figure 14:
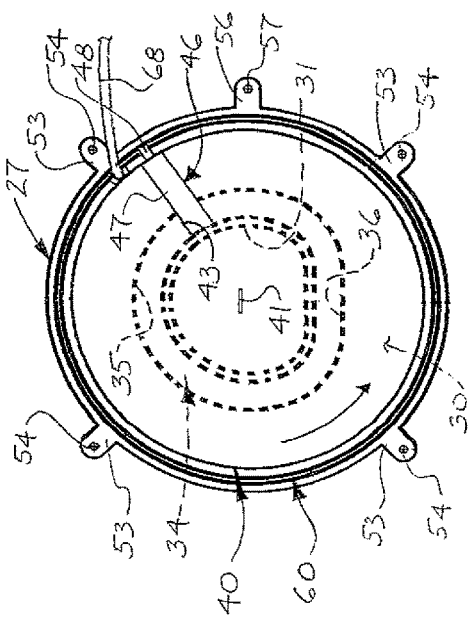
FIG. 14 is a top view of the decoy line actuating mechanism with the catch pin deployed in the line catching position and catching or snagging and pulling the decoy actuating line in the mechanism housing of the decoy line actuating mechanism.
Figure 15:
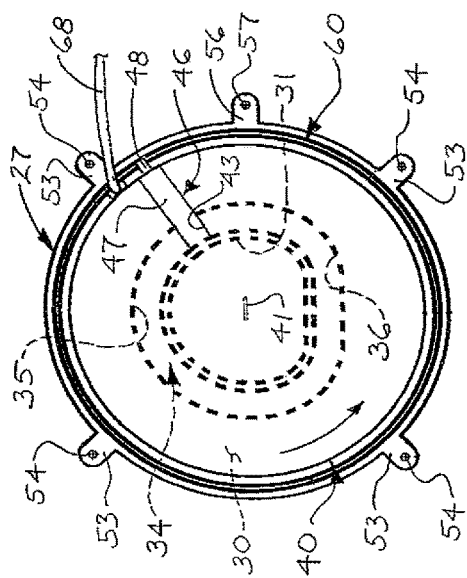
FIG. 15 is a top view of the decoy line actuating mechanism, with the catch pin deployed in the line releasing position and disengaging or releasing the decoy actuating line.
Figure 16:
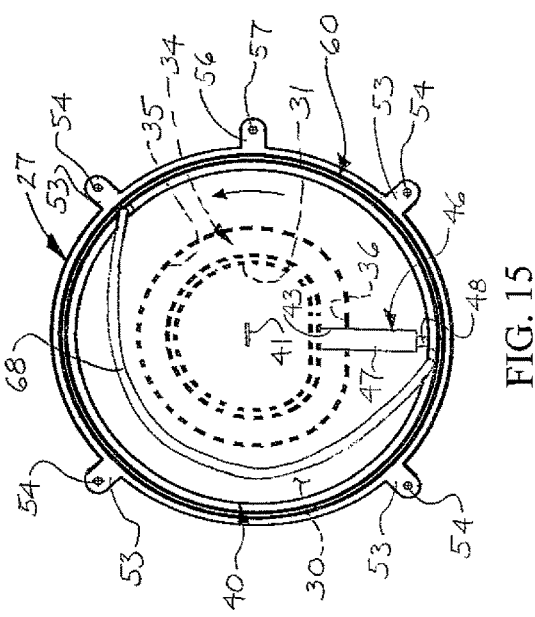
FIG. 16 is a top view of the decoy line actuating mechanism after the catch pin has returned to the line catching position just prior to again catching or snagging the decoy actuating line as illustrated in FIG. 13.

As the catch pin plate 40 continues to rotate, as illustrated in FIG. 14, the line engaging pin portion 48 of the catch pin 46 pushes the decoy actuating line 68 along the actuating line space 60, such that a portion of the exterior segment of the decoy actuating line 68 which extends between the decoy line actuating mechanism 26 and the waterfowl decoy 64 is pulled into the mechanism housing interior 29 of the mechanism housing 27 through the cover actuating line opening 55 (FIG. 10) in the housing cover 52. This pulling action of the decoy actuating line 68 continues until the catch pin flange 49 on the catch pin 46 transitions from the line engaging track portion 35 (FIG. 11) into the line disengaging track portion 36 of the catch pin track 34, as illustrated in FIG. 12, and the catch pin 46 slides in the radial direction in the catch pin slot 43 from the outer position illustrated in FIG. 8 toward the center of the catch pin plate 40 to the inner position illustrated in FIG. 9. Accordingly, as illustrated in FIGS. 9, 12 and 15, the line engaging pin portion 48 of the catch pin 46 clears the actuating line space 60 and disengages or releases the decoy actuating line 68. Thus, the decoy actuating line 68, tensioned due to the buoyancy of the waterfowl decoy 64 on the water body 76 (FIG. 2), as will be hereinafter further described, is pulled from the mechanism housing interior 29 through the cover actuating line opening 55 in the housing cover 52 and returns to the original position illustrated in FIG. 13.

Upon continued rotation of the catch pin plate 40, the catch pin flange 49 transitions from the line disengaging track portion 36 (FIG. 12) back into the line engaging track portion 35 (FIG. 11) of the catch pin track 34 as the catch pin 46 slides in the radial direction in the catch pin slot 43 from the inner position illustrated in FIG. 9 back toward the mechanism housing wall 28 to the outer position illustrated in FIG. 8. Accordingly, the line engaging pin portion 48 of the catch pin 46 again spans the actuating line space 60 and approaches the decoy actuating line 68, as illustrated in FIG. 16, where it again catches or snags (FIG. 13) and pulls (FIGS. 14 and 15) the decoy actuating line 68 back into the mechanism housing interior 29 through the cover actuating line opening 55, and the process is repeated.

Referring again to FIGS. 1, 2 and 2A of the drawings, in typical application, the first actuating line end 69 of the decoy actuating line 68 may be tied or otherwise attached to the actuating line attachment flange 14 on the apparatus base housing 3 of the apparatus base 2, as illustrated in FIG. 2A. The housing cover 52 may be detached from the mechanism housing 27 typically by removal of the cover mount fasteners 54 (FIG. 5). The decoy actuating line 68 is threaded through the housing actuating line opening 38 (FIG. 10) in the mechanism housing bottom 30 of the mechanism housing 27 and extended through the registering cover actuating line opening 30 in the housing cover 52, after which the housing cover 52 is re-attached to the mechanism housing 27. The second actuating line end 70 of the decoy actuating line 68 may be tied or otherwise attached to the decoy hook 65 of the waterfowl decoy 64.

The apparatus base 2 is deployed on the water body bottom 77 of the water body 76. The base weight 12 (FIG. 3) may first be placed in the apparatus base housing 3 of the apparatus base 2 to weight the apparatus base 2 such that it remains in place on the water body bottom 77 and is rendered immovable due to the currents and movements of the water in the water body 76. In some applications, the anchor line 72 may be attached to the anchor line attachment flange 5, as illustrated in FIGS. 1 and 2, and tied or otherwise attached to a post or other support (not illustrated) to further anchor the apparatus base 2 on the water body bottom 77, as was heretofore described. The motor switch 19 is manipulated to the "on" position to operate the plate drive motor 18. Accordingly, the plate drive motor 18 rotates the catch pin plate 40 in the mechanism housing interior 29 of the mechanism housing 27 such that the catch pin 46 slides in the radial direction in the catch pin slot 43 (FIGS. 8 and 9), and the line engaging pin portion 48 of the catch pin 46 alternately catches and releases the decoy actuating line 68, as was heretofore described with respect to FIGS. 13-16. Therefore, the decoy actuating line 68 alternately pulls against and releases the decoy hook 65 of the waterfowl decoy 64, causing the waterfowl decoy 64 to repeatedly assume the feeding or diving motion from the upright position illustrated in FIG. 1 to the forwardly-pitched position illustrated in FIG. 2. This repeating feeding or diving action of the waterfowl decoy 64 on the water body 76 attracts waterfowl flying in the area to the waterfowl decoy 64 typically for hunting or observation purposes.

While illustrative embodiments of the disclosure have been described above, it will be recognized and understood that various modifications can be made and the appended claims are intended to cover all such modifications which may fall within the spirit and scope of the disclosure.

What is claimed is:

1. A decoy actuating apparatus for actuating a decoy, comprising:
    a decoy line actuating mechanism including:
        a mechanism housing;
        a mechanism housing interior in the mechanism housing;
        a catch pin track in the mechanism housing and communicating with the mechanism housing interior, the catch pin track having a line engaging track portion and a line disengaging track portion;
        a catch pin plate disposed for rotation in the mechanism housing interior of the mechanism housing;
        a plate drive motor drivingly engaging the catch pin plate for rotation;
        a catch pin slot in the catch pin plate;
        an actuating line space between the catch pin plate and the mechanism housing; and
        a catch pin disposed for sliding displacement in the catch pin slot of the catch pin plate and interfacing with the catch pin track, the catch pin deployed in a line catching position and protruding into the actuating line space when engaging the line engaging track portion and in a line releasing position and clearing the actuating line space when engaging the line disengaging track portion of the catch pin track; and
    a decoy actuating line extending through the actuating line space.

2. The decoy actuating apparatus of claim 1 further comprising an apparatus base including an apparatus base housing and a housing cover carried by the apparatus base housing, and wherein the mechanism housing of the decoy line actuating mechanism is carried by the housing cover.

3. The decoy actuating apparatus of claim 2 further comprising at least one housing anchor flange carried by the apparatus base housing and an anchor line attached to the at least one housing anchor flange.

4. The decoy actuating apparatus of claim 1 further comprising a housing cover carried by the mechanism housing and closing the housing interior.

5. The decoy line actuating apparatus of claim 4 further comprising an actuating line opening in the housing cover, and wherein the decoy actuating line extends through the actuating line opening.

6. The decoy actuating apparatus of claim 1 further comprising an apparatus base and at least one base weight carried by the apparatus base, and wherein the mechanism housing of the decoy line actuating mechanism is carried by the apparatus base.

7. The decoy actuating apparatus of claim 1 wherein the catch pin comprises a catch pin body, a catch pin flange carried by the catch pin body and inserted in the catch pin track and a line engaging pin portion extending from the catch pin body.

8. The decoy actuating apparatus of claim 1 wherein the catch pin plate comprises a central plate drive motor shaft opening engaged by the plate drive motor and an outer plate edge, and wherein the catch pin slot extends in radial relationship between the plate drive motor shaft opening and the outer plate edge.

9. A decoy actuating apparatus for actuating a decoy, comprising:
    an apparatus base; and
    a decoy line actuating mechanism carried by the apparatus base, the decoy line actuating mechanism including:
        a plate drive motor carried by the apparatus base;
        a mechanism housing carried by the apparatus base;
        a mechanism housing interior in the mechanism housing;
        an endless catch pin track in the mechanism housing and communicating with the mechanism housing interior, the catch pin track having a generally curved line engaging track portion and a generally straight line disengaging track portion continuous with the line engaging track portion;
        a catch pin plate disposed in the mechanism housing interior of the mechanism housing and drivingly engaged for rotation by the plate drive motor;
        a catch pin slot in the catch pin plate;
        an actuating line space between the catch pin plate and the mechanism housing; and
        a catch pin disposed for sliding displacement in the catch pin slot of the catch pin plate and interfacing with the catch pin track, the catch pin deployed in a line catching position and protruding into the actuating line space when engaging the line engaging track portion and in a line releasing position and clearing the actuating line space when engaging the line disengaging track portion of the catch pin track; and
    a decoy actuating line extending through the actuating line space.

10. The decoy actuating apparatus of claim 9 wherein the apparatus base comprises an apparatus base housing and a housing cover carried by the apparatus base housing, and the mechanism housing of the decoy line actuating mechanism is carried by the housing cover.

11. The decoy actuating apparatus of claim 10 further comprising at least one housing anchor flange carried by the apparatus base housing and an anchor line attached to the at least one housing anchor flange.

12. The decoy actuating apparatus of claim 9 further comprising a housing cover carried by the mechanism housing and closing the housing interior.

13. The decoy line actuating apparatus of claim 12 further comprising an actuating line opening in the housing cover, and wherein the decoy actuating line extends through the actuating line opening.

14. The decoy actuating apparatus of claim 9 further comprising at least one base weight carried by the apparatus base.

15. The decoy actuating apparatus of claim 9 wherein the catch pin comprises a catch pin body, a catch pin flange carried by the catch pin body and inserted in the catch pin track and a line engaging pin portion extending from the catch pin body.

16. The decoy actuating apparatus of claim 9 wherein the catch pin plate comprises a central plate drive motor shaft opening engaged by the plate drive motor and an outer plate edge, and wherein the catch pin slot extends in radial relationship between the plate drive motor shaft opening and the outer plate edge.

17. A decoy actuating apparatus for actuating a decoy, comprising:
   an apparatus base including:
      an apparatus base housing;
      a housing interior in the apparatus base housing;
      a plate drive motor in the housing interior;
      a housing cover carried by the apparatus base housing and closing the housing interior, and
      an actuating line opening in the housing cover;
   a decoy line actuating mechanism carried by the apparatus base, the decoy line actuating mechanism including:
      a mechanism housing having:
         a mechanism housing bottom carried by the housing cover of the apparatus base housing;
         a cylindrical mechanism housing wall carried by the mechanism housing bottom; and
         a mechanism housing interior formed by the mechanism housing bottom and the mechanism housing wall;
      an endless catch pin track in the mechanism housing bottom of the mechanism housing and communicating with the mechanism housing interior, the catch pin track having a generally curved line engaging track portion and a generally straight line disengaging track portion continuous with the line engaging track portion;
      a circular catch pin plate disposed in the mechanism housing interior of the mechanism housing and drivingly engaged for rotation by the plate drive motor;
      a catch pin slot in the catch pin plate;
      an actuating line space between the catch pin plate and the mechanism housing; and
      a catch pin disposed for sliding displacement in the catch pin slot of the catch pin plate and interfacing with the catch pin track, the catch pin deployed in a line catching position and protruding into the actuating line space when engaging the line engaging track portion and in a line releasing position and clearing the actuating line space when engaging the line disengaging track portion of the catch pin track; and
   a decoy actuating line extending through the actuating line space in the mechanism housing and the actuating line opening in the housing cover.

18. The decoy actuating apparatus of claim 17 wherein the catch pin comprises a catch pin body, a catch pin flange carried by the catch pin body and inserted in the catch pin track and a line engaging pin portion extending from the catch pin body.

19. The decoy actuating apparatus of claim 17 wherein the catch pin plate comprises a central plate drive motor shaft opening engaged by the plate drive motor and an outer plate edge, and wherein the catch pin slot extends in radial relationship between the plate drive motor shaft opening and the outer plate edge.

20. The decoy actuating apparatus of claim 17 further comprising at least one base weight in the housing interior of the apparatus base housing.

* * * * *